United States Patent [19]

Janssen et al.

[11] Patent Number: 5,447,279
[45] Date of Patent: Sep. 5, 1995

[54] BI-COMPLIANT TAPE GUIDE

[75] Inventors: Don Janssen, Boulder; Barry Spicer, Berthold; Christian A. Todd, Denver, all of Colo.

[73] Assignee: Storage Technology Corporation, Louisville, Colo.

[21] Appl. No.: 109,772

[22] Filed: Aug. 20, 1993

[51] Int. Cl.6 .................... B65H 23/032; G11B 15/60
[52] U.S. Cl. ...................................... 242/358; 226/196
[58] Field of Search ............... 242/615.3, 346, 358, 242/548.2; 360/130.21, 132; 226/196

[56] References Cited

U.S. PATENT DOCUMENTS

| | | | |
|---|---|---|---|
| 3,850,358 | 11/1974 | Nettles | 226/198 |
| 3,984,039 | 10/1976 | Hawley et al. | 226/97 |
| 4,305,536 | 12/1981 | Burdorf et al. | 226/97 X |
| 4,842,177 | 6/1989 | Callender et al. | |
| 5,160,078 | 11/1992 | Spicer | |
| 5,251,844 | 10/1993 | Albrecht et al. | |
| 5,297,755 | 3/1994 | Felde et al. | |
| 5,316,235 | 5/1994 | East et al. | |

OTHER PUBLICATIONS

IBM Technical Disclosure Bulletin vol. 34 No. 9 Feb. 1992 DeLessio et al "Parapet air-bearing with gravity button tape guides".
IBM Technical Disclosure Bulletin vol. 27 No. 6 Nov. 1984 Wightman "Air bearing tape guide".
IBM Technical Disclosure Bulletin vol. 26 No. 8 Jan. 1984 Smith et al "Variable spring-rate compliant guide".
IBM Technical Disclosure Bulletin vol. 25 No. 2 Jul. 1982 Clegg et al "Compliant tape guide".
IBM Technical Disclosure Bulletin vol. 24 No. 12 May 1982 Bareman et al "Air bearing".
IBM Technical Disclosrue Bulletin vol. 16 No. 12 May 1974 Hagopian "Thermomagnetic Transfer Mass Storage".
IBM Technical Disclosure Bulletin vol. 16 No. 12 May 1974 Curry et al "Air bearing construction".
IBM Technical Disclosure Bulletin, Dated Jan. 1973, vol. 15, No. 8.
IBM Technical Disclosure Bulletin, Dated Dec. 1984, vol. 27, No. 7b.
IBM Technical Disclosure Bulletin, Dated Oct. 1986, vol. 29, No. 5.

*Primary Examiner*—John P. Darling
*Attorney, Agent, or Firm*—Pennie & Edmonds

[57] ABSTRACT

This invention is directed to a tape guide that minimizes the effects of vertical position error at the reels of a reel to reel tape drive by providing gentle tape guidance forces and coarse correction of magnetic tape and reduces the amount of debris accumulation and tape wear resulting from the load between the magnetic tape and the guiding elements of the tape guide, said tape guide having two compliant flanges and an tape guiding surface, said complaint flange comprising a plurality of spring members extending individually from a base member and a pad having high wear resistance and high mechanical strength mounted at the end of each spring member.

8 Claims, 6 Drawing Sheets

BI-COMPLIANT TAPE GUIDE

BACKGROUND

1. Technical field

This invention relates to the field of tape guides for a reel-to-reel tape drive system.

2. Background art

Data processing systems have traditionally utilized magnetic tape as a data storage medium. Information is stored on magnetic tape in a very dense format. The position of the magnetic tape must be precisely controlled with respect to a read/write magnetic head to provide accurate reading and writing of information on the magnetic tape.

Typically, magnetic tape is wound and rewound between reels in a reel-to-reel tape drive. A prior art reel-to-reel tape drive system is illustrated in FIG. 1a. The tape drive includes supply reel 1 on which tape 7 is initially wound, first tape guide 2, second tape guide 3a, magnetic read/write head 4, third tape guide 3b, fourth tape guide/transducer 5, and take up reel 6. One critical area for accurately positioning magnetic tape 7 is in the vicinity of the read/write magnetic head 4. Read/write magnetic head 4 reads information from and writes information to magnetic tape 7. Tape guides 3a and 3b are placed just prior to and just after read/write magnetic head 4 to ensure the appropriate tracks of magnetic tape 7 are positioned relative to magnetic head 4.

A second critical area for accurately controlling the position of the magnetic tape is immediately following the supply reel and immediately preceding the take-up reel. Referring again to FIG. 1a, first tape guide 2 decouples the tape from supply reel 1 and fourth tape guide 5 guides the tape onto the take-up reel 6. Note that reel-to-reel tape drives are bi-directional. Therefore, at times when the direction in which the tape is processed through the drive is reversed, supply reel 1 acts as a take-up reel and first tape guide 2 will guide the tape onto the supply reel 1. Similarly, take-up reel 6 behaves as a supply reel and fourth guide 5 performs as a fixed guide.

The position of the magnetic tape edge as it leaves the supply reel can be vertically displaced by as much as ±0.050 inch from its nominal tape edge location at the read/write head. Of the ±0.050 inch position error, ±0.020 inch arises from manufacturing tolerances associated with the vertical location of the supply reel with respect to the tape path or read/write head. The remaining ±0.030 inch is a result of "stagger wrap." A cross sectional view of a tape reel with stagger wraps 91 is illustrated in FIG. 1b. Stagger wraps 91 are caused by the vertical wandering of the tape as it is being wound onto a reel—possibly from one flange 90 of the reel to the other. Stagger wraps 91 are wraps of the tape around the tape reel, stacked against either the top or bottom of the supply reel flanges 90.

Vertical position error of the tape also occurs when the tape, as it is processed in the reverse direction, exits the take-up reel. Because the take-up reel is fixed, the overall vertical position error can be kept smaller, on the order of ±0.020 inch.

Modern reel-to-reel tape drives use two types of tape guides to control the positioning of magnetic tapes. A first type, commonly referred to as a fixed guide, is illustrated in FIG. 2. The fixed guide is comprised of fixed flanges 10a and 10b which are affixed to the top and bottom ends of the arcuate surface 12. Both flanges 10a and 10b help guide magnetic tape 11 over arcuate surface 12. Without flanges 10a and 10b, magnetic tape 11 might become displaced with respect to arcuate surface 12 and could, under appropriate circumstances, allow magnetic tape 11 to move away from the read/write head so that information could not be read from or written to the magnetic tape.

A second type of tape guide, commonly referred to as a fine guide, is illustrated in FIG. 3. The fine guide is comprised of one fixed flange 20, one compliant flange 23 and arcuate surface 25. Fixed flange 20 is affixed to the bottom end of arcuate surface 25 and compliant flange 23 is affixed to the top end. Compliant flange 23 forces magnetic tape 24 against fixed flange 20. In one particular prior art embodiment of a fine guide, illustrated in FIG. 3, compliant flange 23 is comprised of a plurality of spring members 22 extending individually from a base member. At the end of each spring member 22, a pad 21 having high wear resistance and high mechanical strength is mounted. The separate pads 21 individually contact tape 24, thus ensuring the performance of the guide as a true compliant guide.

There are a number of disadvantages to using either fixed guides or fine guides in reel-to-reel tape drives. One disadvantage associated with fixed guides is the result of stagger wraps. Stagger wraps, as described above, are the vertical displacement of magnetic tape 7 against one or the other of the reel flanges 90 (see FIG. 1b).

Referring back to FIG. 1a, stagger wraps may be present when the tape leaves supply reel 1 and enters first tape guide 2. In present tape drives, there is approximately 2.5 inches between supply reel 1 and the first tape guide 2. The tape may be displaced up to ±0.050 inch from its nominal position when it exits reel 1. If the tape exits reel 1 up 0.050 inch, the tape will be forced against the upper flange of first tape guide 2. Likewise, if the tape exits the reel 1 down 0.050 inch, the tape will be forced against the lower flange of first tape guide 2. With no ability to correct totally for this displacement, tape 7 can buckle and crease FIG. 4, potentially causing a loss of data. At a minimum, it causes poor tracking of magnetic tape 7 and dramatically increases tape wear.

Another problem associated with fixed guides relates to the friction generated from the movement of the magnetic tape against the fixed flanges of such guides. Magnetic tape is often manufactured from chromium dioxide. The fixed flanges of the fixed guides are generally composed of stainless steel, a softer substance than chromium dioxide. The movement of the abrasive edge of the chromium dioxide magnetic tape against the tape guides erodes the softer stainless steel fixed flanges. This erosion causes grooves to develop in the tape guides which reduces accuracy of the positioning of the magnetic tape relative to the read/write head and transducers. Further, the grooves increase the surface friction of the tape guides which increases the rate at which magnetic tape wears out. In addition, debris accumulates as a result of the erosion which further reduces the effectiveness of the tape drive.

For the foregoing reasons, there is a need for a tape guide that (1) minimizes the effects of stagger wraps by providing gentle tape guidance forces and coarse correction for vertical displacement error of the magnetic tape; and (2) reduces the amount of debris accumulation and tape wear.

SUMMARY OF THE INVENTION

This invention is directed to a tape guide that minimizes the effects of vertical position error at the reels, such as stagger wraps, by providing gentle tape guidance forces and coarse correction of the magnetic tape.

A tape guide having the features of the present invention comprises two compliant flanges and a tape guiding surface. A compliant flange is affixed to the top and bottom end of the tape guiding surface to form a bi-compliant tape guide.

It is another object of the present invention to reduce the amount of debris accumulation and tape wear resulting from the load between the magnetic tape and the guiding elements of the tape guides.

In accordance with the preferred embodiment, to reduce the amount of debris accumulation and tape wear, each of the compliant flanges is comprised of a plurality of spring members extending individually from a base member. At the end of each spring member a pad having high wear resistance and high mechanical strength is mounted.

It is yet another object of the present invention to guide tape prior to the fine guides by progressively loading the tape, i.e., by gently guiding the tape from the supply reel to the magnetic head incrementally correcting the vertical tape movement.

In accordance with the preferred embodiment, to achieve progressive loading, the tension of each spring member can be adjusted individually to be stiffer or looser such that the tape is first guided by looser spring members (or stiffer spring members) and gradually guided by increasingly stiffer spring members (or looser spring members).

BRIEF DESCRIPTION OF THE DRAWINGS

FIG. 1b is an illustration of stagger wrap a reoccurring problem in prior art tape drives.

DETAILED DESCRIPTION OF THE PREFERRED EMBODIMENT

Illustrated in FIGS. 5-8 is an exemplary embodiment of the present invention. The bi-compliant tape guide includes two compliant flanges 41a and 41b which are affixed to the top and bottom of tape guiding surface 45 (see FIG. 5, for perspective view and FIG. 6 for side view). Compliant flanges 41a and 41b are shaped in a semicircular fashion with a curvature that corresponds to the radius of the tape guiding surface 45. Each flange is comprised of a plurality of spring members 44a and 44b extending individually from a base member.

Figure 1A:
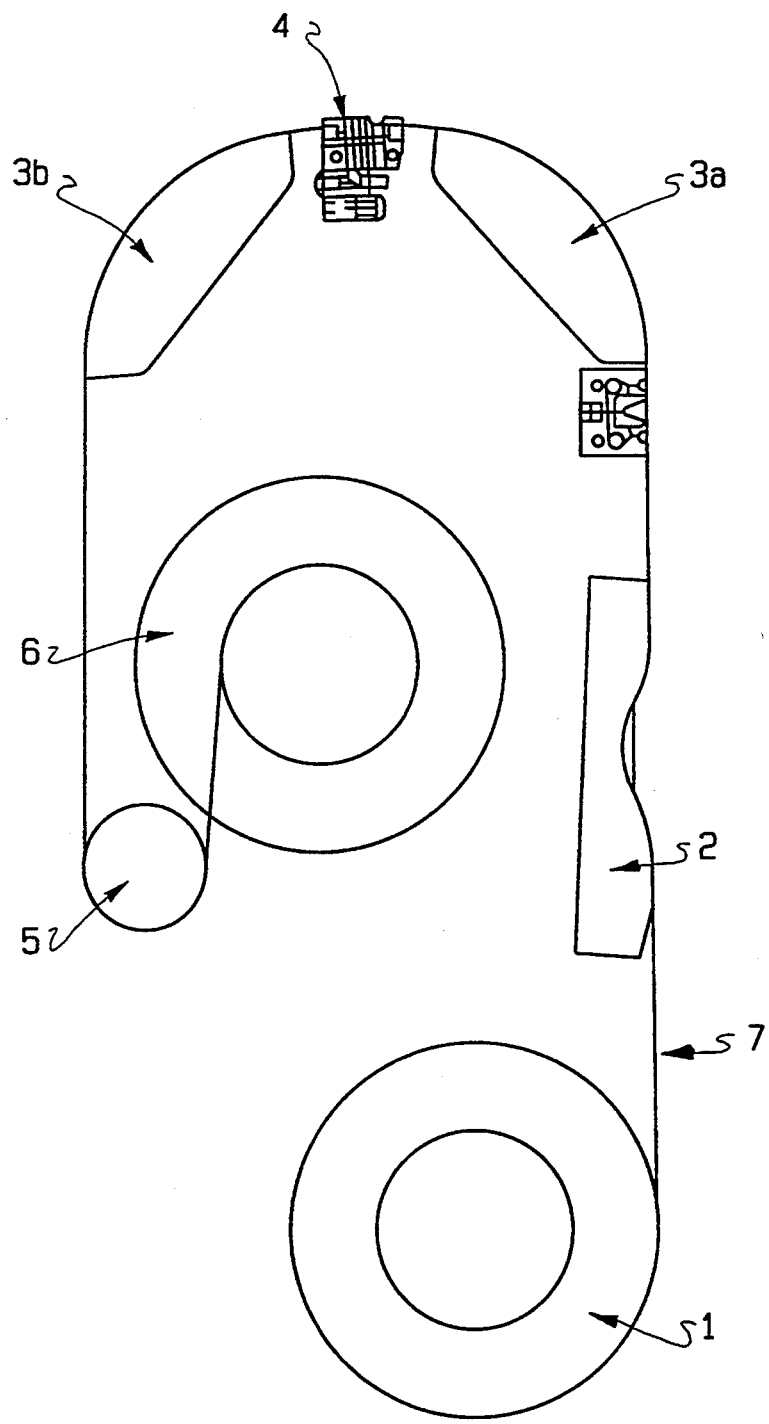
FIG. 1a is a perspective view of a prior art tape drive.
Figure 2:
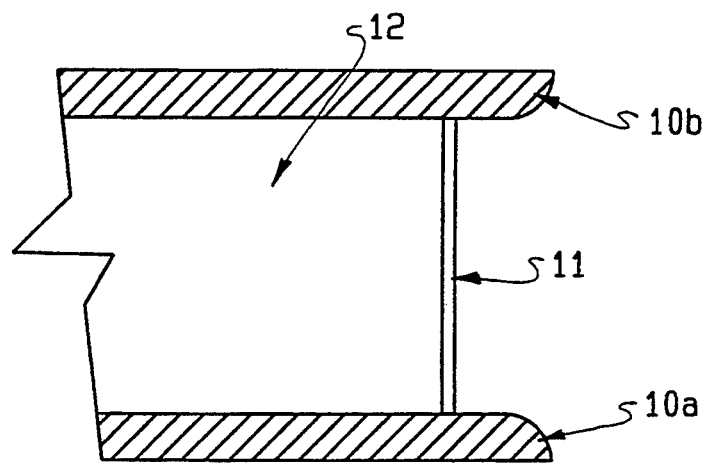
FIG. 2 is a side view of a fixed guide in a prior art tape guide.
Figure 3:
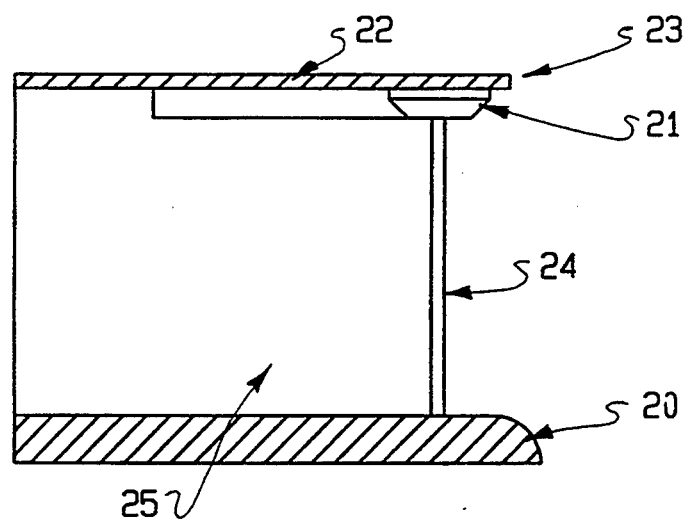
FIG. 3 is a side view of a fine guide in a prior art tape guide.
Figure 4:
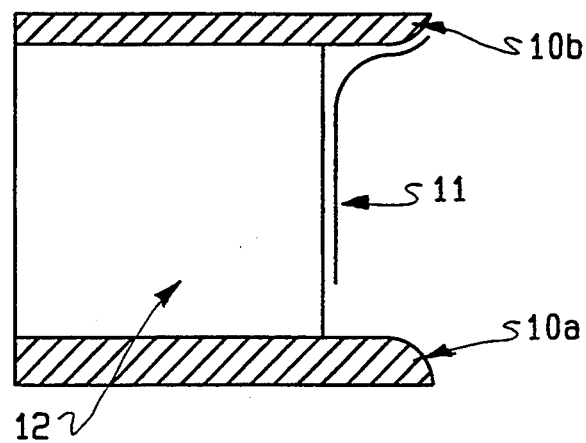
FIG. 4 is a side view of vertical displacement of the tape in a fixed guide in a prior art tape guide.
Figure 5:
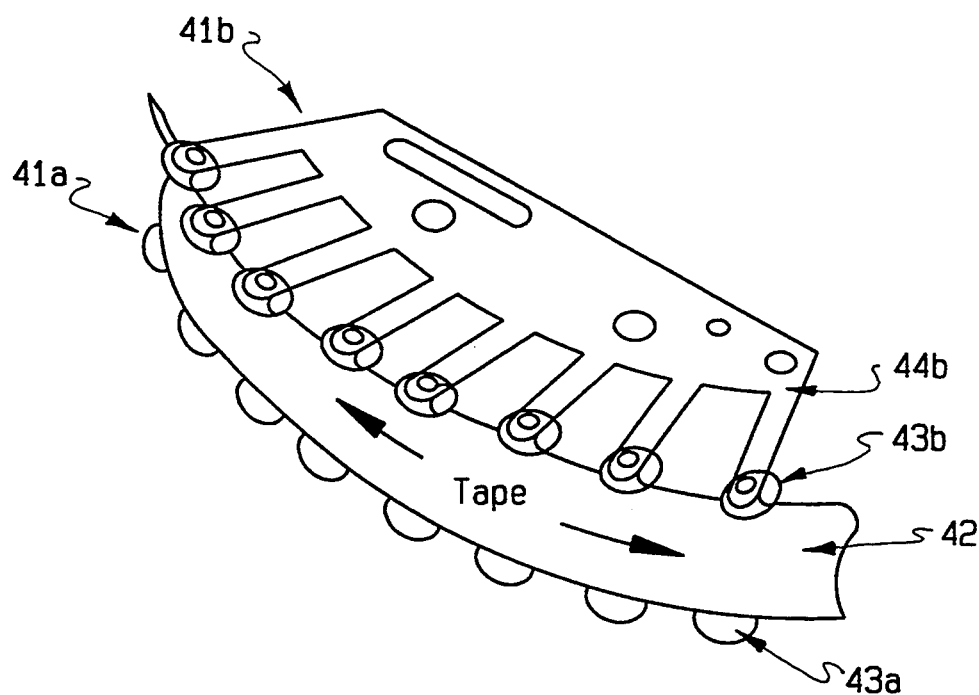
FIG. 5 is a perspective view of the bi-compliant tape guide.
Figure 6:
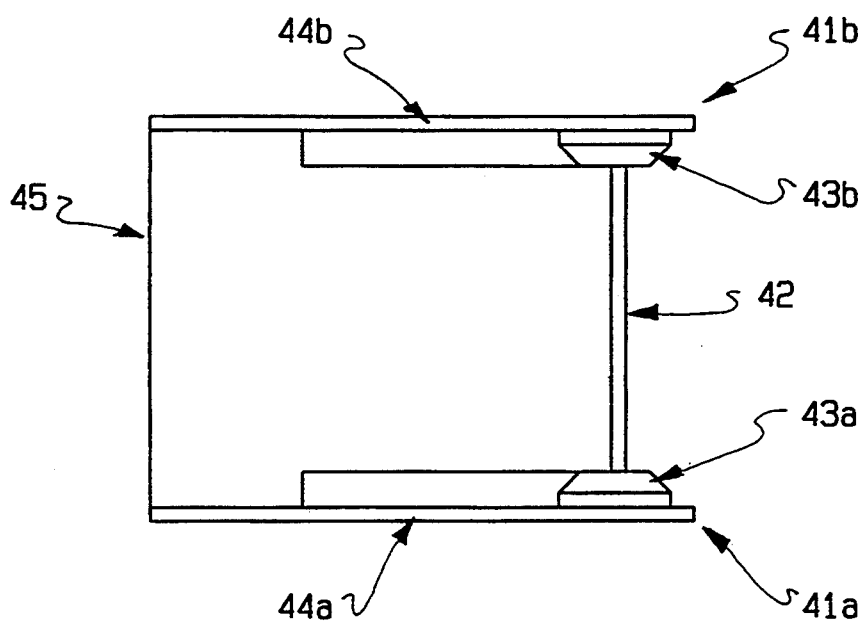
FIG. 6 is a side view of a bi-compliant tape guide according to the present invention.
Figure 7A:
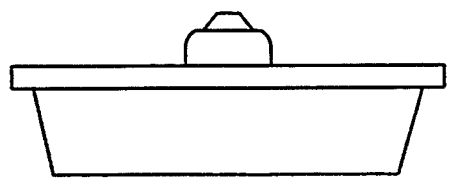
FIG. 7a is a detailed side view of the ceramic pad to be used in conjunction with the bi-compliant tape guide.
Figure 7B:
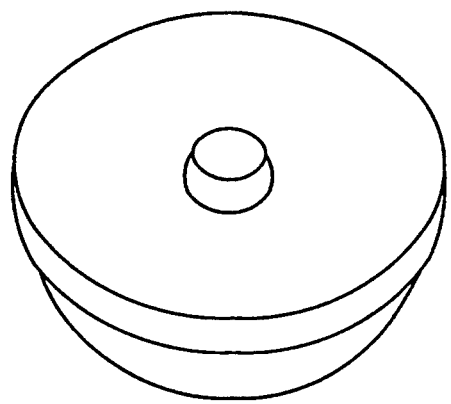
FIG. 7b is a detailed perspective view of the ceramic pad.

FIG. 6 illustrates circular pads 43a and 43b attached to the end of each spring member 44a and 44b. The length of the each spring member 44a and 44b is selected so that circular pads 43a and 43b rest upon the upper and lower edges of tape guiding surface 45. Spring members 44a and 44b are preloaded with a force such that each spring member 44a of lower flange 41a exerts an upward force on the lower edge of tape guiding surface 45 and each spring member 44b of upper flange 41b exerts a downward force on the upper edge of tape guiding surface 45.

When there is vertical displacement of the tape from its nominal position, the edge of the tape will press upwards or downwards against compliant flanges 41a and 41b. As illustrated in FIG. 9b, when the tape is vertically displaced upward, the upper edge of tape 42 contacts pad 43b of upper flange 41b. The spring members 44b of the upper compliant flange 41b absorb the contact with the upper edge of tape 42 by flexing upward. Spring members 44b in conjunction with pad 43b exert a counterbalancing uniform distributed load on the upper edge of tape 42, forcing tape 42 back into its nominal position.

Figure 9A:
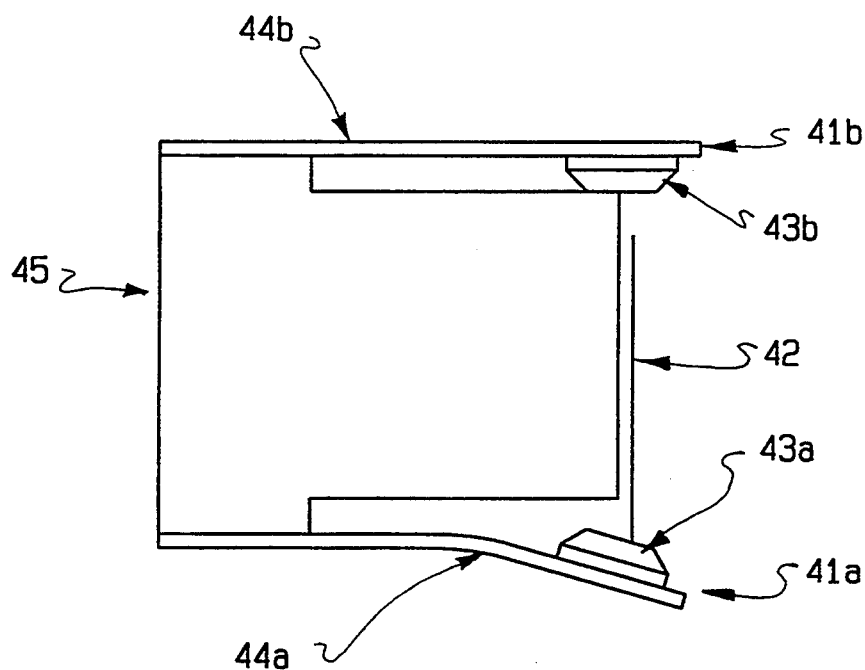
FIG. 9a is side view of how the bi-compliant tape guide accommodates downward vertical displacement.
Figure 9B:
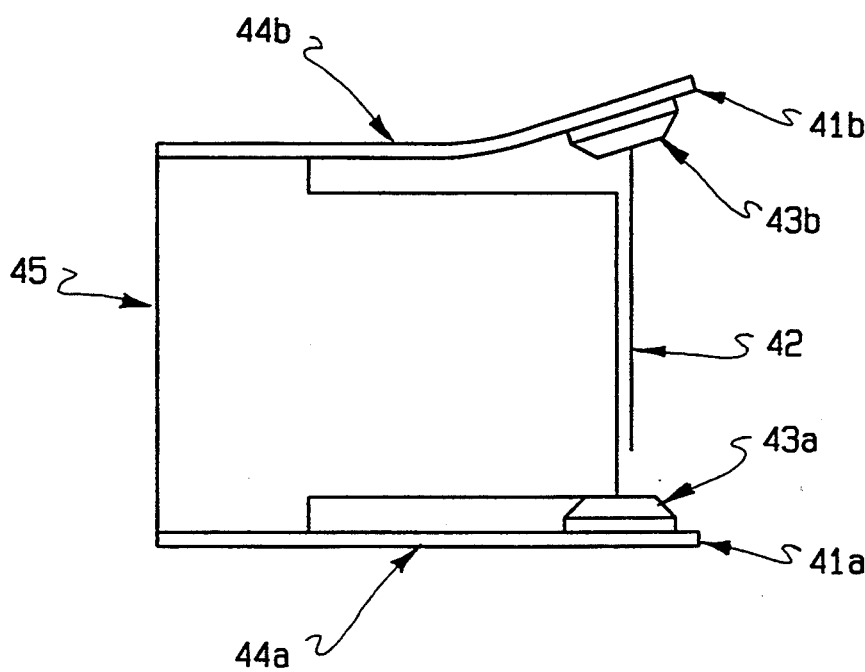
FIG. 9b is a side view of how the bi-compliant tape guide accommodates upward vertical displacement.

Similarly, as illustrated in FIG. 9a, when tape 42 is vertically displaced downward, the lower edge of tape 42 contacts pad 43a of lower flange 4a. The spring members 44a of lower compliant flange 41a absorb the contact with the lower edge of tape 42 by flexing downward. Spring members 44a in conjunction with pad 43a exert a counterbalancing uniform distributed load on the lower edge of tape 42, forcing tape 42 back into its nominal position.

The ability of the compliant flanges to absorb the contact with the edges of the tape prevents the tape from buckling or creasing as it otherwise would if the flanges were fixed. This correction of vertical displacement error sharply reduces the previously discussed problem associated with stagger wraps. In the prior art, if the magnetic tape exits the supply reel up 0.050 inch, the tape is likely to buckle at the upper flange of a fixed guide. Likewise, if the tape exits the reel down 0.050 inch, the tape might buckle at the lower flange of a fixed or fine guide. An advantage of bi-compliant guiding is the application of a gentle guiding force so the vertical position of the tape can be corrected. This gentle guiding force is limited so that the tape will not buckle. Accordingly, while a fixed guide attempts to obtain correction immediately, the bi-compliant guide progressively nudges the tape back to its nominal position.

The material of the spring members is selected for spring characteristics. In one embodiment, the spring material is fabricated of stainless steel, although other materials are also suitable.

The spring tension is selected in direct proportion to the thickness of the magnetic tape. In prior art tape drives, magnetic tapes were approximately 0.001 inches thick and the force exerted by the tape guides was about 3-4 grams. More recent tape drives, however, have utilized tape half that thickness or 0.0005 inches. To accommodate the less resistant and thinner tape, the present embodiment utilizes a preloaded spring force of 1±0.25 grams. In other words, in the nominal position each spring member exerts a force of approximately 1 gram.

It will be appreciated by a person of ordinary skill in the art that the individual spring members of the compliant flange can be manufactured to have varying stiffness. This can be accomplished by varying the length, width or thickness of the spring member.

Referring back to FIG. 6, tape guiding surface 45 of this bi-compliant tape guide has a width greater than the width of tape 42. Since the width of tape contacting region is greater than the width of tape 42, tape 42 will press upwards or downwards against compliant flanges 41a and 41b only when there is vertical tape movement from the nominal position. When tape 42 is vertically displaced, spring members 44a and 44b of compliant flanges 41a and 41b will exert a counterbalancing uniform distributed load on the upper or lower edge of tape 42, forcing tape 42 back into its nominal position. This prevents vertical displacement, thus improving the tracking capability and reducing the wear on tape 42.

In an alternative embodiment, the width of the tape guiding surface is less than the width of tape 42. The tape 42 remains in continuous contact with spring members 44a and 44b of compliant flanges 41a and 41b. The spring members 44a and 44b exert a uniform distributed load on the upper and lower edges of tape 42 regardless of variations in tape width. The lower edge of tape 42 is forced against lower compliant flange 41a and the upper edge of tape 42 is forced against upper flange 41b by the uniform distributed load. Vertical displacement of tape 42 is prevented, thus improving the tracking capability of and reducing the wear on tape 42.

In a further alternative embodiment, the tension of individual spring members in the bi-compliant guide can be made nonuniform. Thus, as the tape enters the guide, it first encounters softer, more compliant spring members (which may have greater deflection due to a stagger wrap) and progressively meets stiffer, less compliant spring members. This allows the bi-compliant tape guide to limit the "load" on the tape from the supply reel and more gently guide the tape through the tape drive—thereby improving tracking capability and reducing tape wear.

Similarly, by reversing the direction the tape is processed through the tape drive, the tape would first encounter stiffer, less compliant spring members and progressively meet softer, more complaint spring members.

In an additional embodiment, the tension of the spring members of either one or both of the complaint flanges could be made stiffer than the tape itself. In these configurations, the complaint flanges act as fixed flanges.

At the end of each spring member, a circular pad substantially shaped like a button (shown in FIG. 7a,b) is press fed with respect to the springs and not rotatable. If desired, the pads could be mounted for rotation with respect to the spring members in order to prevent formation of a wear line across the pads; but research has demonstrated that rotating pads create a vibrational disturbance that causes unwanted tape excitation. The pad material is selected for wear properties, i.e. having a high wear resistance and high mechanical strength so that they will withstand any abrasion from the tape. In one embodiment, the pads are fabricated of an alumina ceramic material which will not erode from the chromium dioxide surface of the magnetic tape. Thus, friction between the tape and the guide is sharply reduced, extending the tape wear life and improving the effectiveness of the tape drive.

Figure 8:
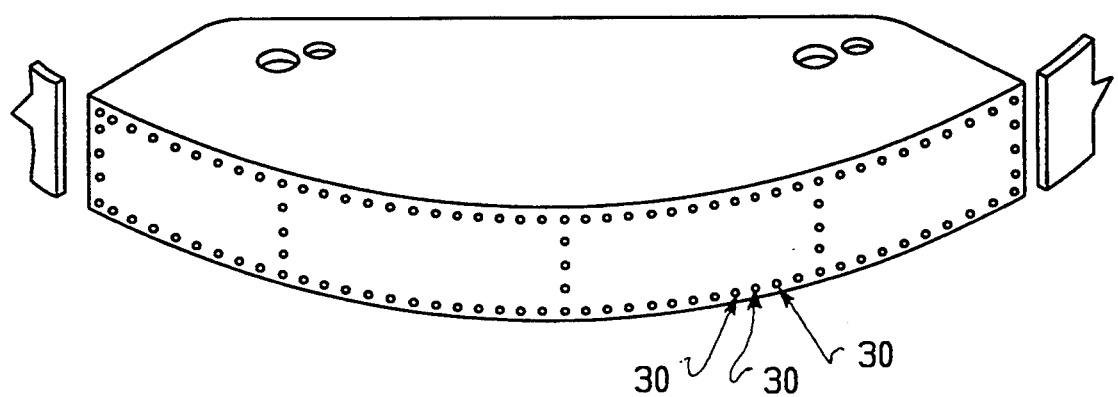
FIG. 8 is a perspective view of a tape guiding surface utilizing an air bearing unit.

The tape guiding surface upon which the tape rides utilizes an air bearing support unit (see FIG. 8). Small apertures 30 in the tape guiding surface allow air, or any gaseous medium, under pressure to be forced out through apertures 30 so as to provide an air cushion over which the tape travels. The creation of such an air bearing surface is well known in the art and need not be detailed herein.

Figure 11:
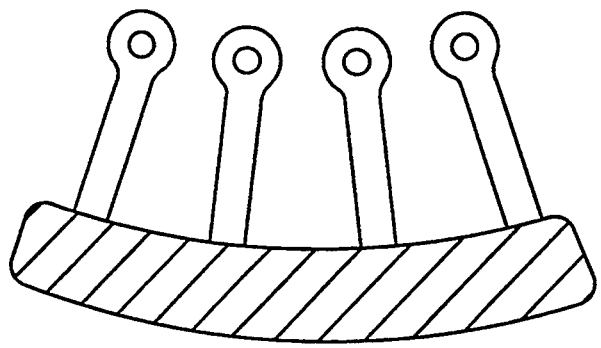
FIG. 11 is a sectional view of an alternative embodiment of a compliant flange.

A further embodiment of the present invention is illustrated in FIG. 11. Unlike the embodiment shown in FIG. 5 where the spring members of the compliant flange radially project outward, FIG. 11 illustrates a reverse curvature compliant flange whose spring members radially project inward in semicircular fashion with a curvature that corresponds to the radius of the tape guiding surface. Again referring back to FIG. 5, the two compliant flanges are affixed to the top and bottom of the tape guiding surfaces 45. In contrast, the reverse curvature compliant flange shown FIG. 11 is affixed directly across from the tape guiding surface of the tape guide. Nevertheless, the ends of the spring members of the reverse curvature compliant flange fall along the tape path and guide the tape in the same manner as the compliant flange described above. The reverse curvature compliant flange, because it is not mounted or connected to the tape guide, can be serviced or replaced without having to disrupt or replace the entire tape guide.

Figure 10:
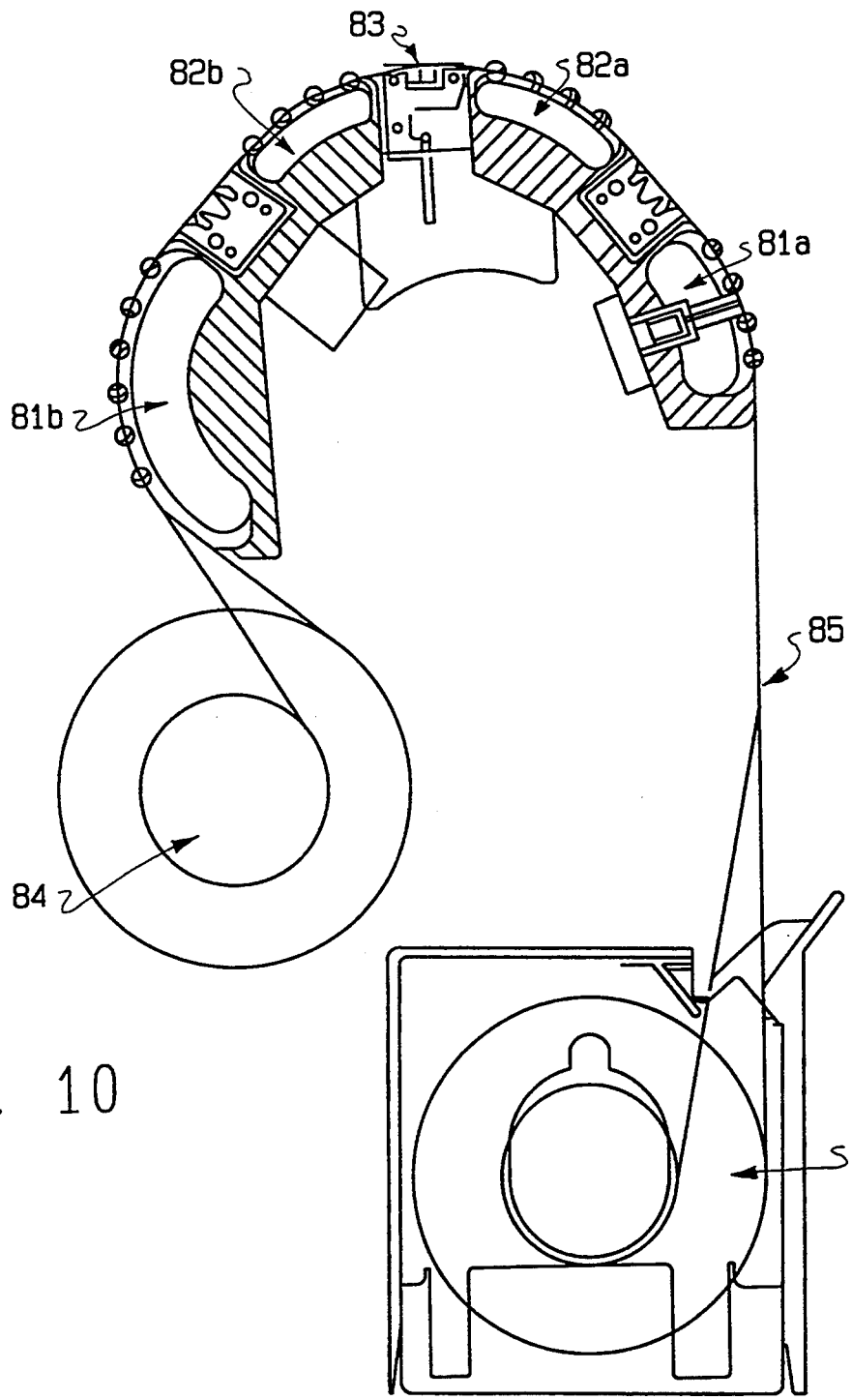
FIG. 10 is a perspective view of a tape drive using one possible preferred exemplary embodiment of the tape guide of the present invention.

The present invention is considered to have particular utility with a standard tape cartridges in computer tape drive systems. Conventional compliant guides, such as the ones used in the IBM 3480/STK 4480 tape drive system and the ones disclosed in U.S. Pat. No. 3,850,358, are used to accurately guide tape through a magnetic read/write head or transducer. However, they both require the use of some decoupling mechanism to reduce the lateral motion generated from the supply and take-up reel. In the case of the 3480/STK 4480 tape drive, a fixed guide is used as described infra. In the case of U.S. Pat. Ser. No. 3,850,358, a vacuum column is used to decouple the tape from the supply and take-up reel. The present invention replaces those traditional decouplers but is still meant to be used in conjunction with fine guides. Research has demonstrated that by using the bi-compliant tape guide in conjunction with a fine guide, tape wear life is maximized by eliminating tape edge buckle. One preferred embodiment in a tape drive system illustrated in FIG. 10 be includes a supply reel 80 on which tape 85 is initially wound, a bi-compliant tape guide 81a, a fine guide 82a, a magnetic read/write head 83, another fine guide 82b, another bi-compliant guide 81b and a take up reel 84. Extensive testing has revealed that bi-compliant tape 81a guide utilizing the above described progressive loading can reduce vertical tape displacement from approximately ±50/1000ths of an inch (when exiting reel 80) to ±2-3/1000ths of an inch (when entering fine guide 82a). As a result, when tape 85 reaches fine guide 82a, tape 85 is substantially in the nominal tape position.

The tape guides of the present invention can be utilized in various combinations and applications as necessary to position the tape in a tape drive. For example, bi-compliant tape guides could be used to more accurately guide movie films in movie projectors, tapes in video cassette players and cassettes in tape cassette players.

The present invention provides a simple, effective tape guide which will accurately guide the tape relative to a magnetic tape head or other structure. The present invention does not increase the mass of the system and is relatively inexpensive to manufacture and install.

It is to be expressly understood that the claimed invention is not be limited to the description of the preferred embodiment but encompasses other modifications and alterations within the scope and spirit of the inventive concept.

What is claimed is:

1. An improved tape guide for guiding tape along a tape path in a reel-to-reel tape drive system comprising:
   a tape guiding surface;
   a first compliant edge guide positioned to exert a load on said tape when said tape is laterally displaced from a nominal position on said tape guiding surface in a first direction;
   a second compliant edge guide positioned to exert a load on said tape when said tape is laterally displaced from a nominal position on said tape guiding surface in a second direction opposite from said first direction; and
   said first and second compliant edge guides positioned along the entire guiding surface in which said tape guide guides said tape.

2. An improved tape guide as recited in claim 1 wherein said tape guiding surface comprises an air bearing support unit having apertures through which a gaseous medium is supplied to provide a gaseous cushion between said tape and said tape guiding surface.

3. An improved tape guide as recited in claim 1 wherein said tape guide guides said tape along a tape path and wherein said load exerted by said first and second compliant edge guides is nonuniform along said tape path.

4. An improved tape guide as recited in claim 3 wherein said load exerted by said first and second compliant edge guides increases along said tape path to progressively load said tape.

5. An improved tape guide as recited in claim 3 wherein said load exerted by said first and second compliant edge guides decreases along said tape path to progressively unload said tape.

6. An improved tape guide as recited in claim 1 wherein said first and second compliant edge guides comprise:
   a plurality of spring members; and
   a contact pad adapted to the end of each of said spring members.

7. An improved tape guide as recited in claim 6 wherein said pads are fabricated of a material that can withstand erosion from said tape.

8. An improved tape guide as recited in claim 6 wherein said spring members are made stiffer than said tape so that said first and second compliant edge guides act as a fixed guide.

* * * * *